Oct. 20, 1953     A. MacKENZIE, JR     2,655,789
ROTARY, TURBINE TYPE HYDRAULIC COUPLING

Filed May 4, 1950     2 Sheets-Sheet 1

INVENTOR.
Alexander MacKenzie, Jr.
BY Ross & Ross

Patented Oct. 20, 1953

2,655,789

UNITED STATES PATENT OFFICE 2,655,789

ROTARY, TURBINE TYPE HYDRAULIC COUPLING

Alexander MacKenzie, Jr., Springfield, Mass., assignor of one-half to Louis O. Setterlund, Springfield, Mass.

Application May 4, 1950, Serial No. 160,027

1 Claim. (Cl. 60—54)

My invention relates to improvements in a driving mechanism and the principal objects of the invention are directed to the provision of a driving mechanism which is simple in its form and which consists of a comparatively few parts so as to be economical in its manufacture while at the same time is efficient in its operation.

The driving mechanism is adapted for broad application but it is particularly adapted for driving the shaft of a motor vehicle and is arranged for driving the shaft at various desired speeds.

All of the above objects I accomplish by means of such structure and relative arrangement of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claim hereunto annexed and more fully described and referred to in connection with the accompanying drawings wherein:

Figure 1:
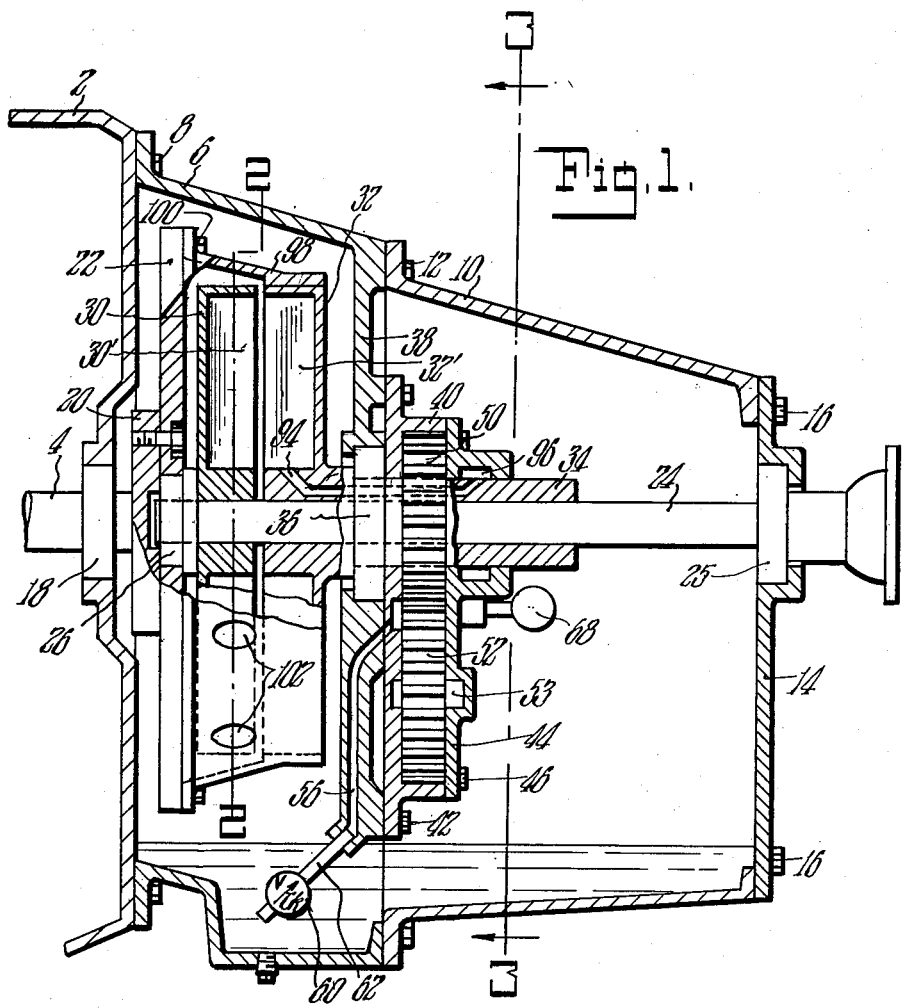
Fig. 1 is a longitudinal sectional elevational view through the driving mechanism embodying the novel features of the invention.

In the above mentioned drawing annexed hereto and forming a part of this specification, I have shown but one embodiment of my invention which is deemed preferable, but it is to be understood that changes and modifications may be made within the scope of the appended claim without departing from the spirit of the invention.

Referring now to the drawing more in detail, and referring more particularly to the preferred form of my invention selected for illustrative purposes, I have shown at 2 a portion of a power means such as an internal combustion engine. A power shaft is represented by 4.

A housing is provided which includes a rear section 6 secured to the means 2 as by bolts 8, an intermediate section 10 secured to the forward end of the rear section 6 as by bolts 12, and a forward cap section 14 secured to the forward end of the intermediate section 10 as by bolts 16.

The power shaft 4 is journalled in an anti-friction bearing 18 of the means 2 and has a flange 20 bolted to a rear disc 22.

A driven shaft 24 is journalled at its forward end in a bearing 25 of the member 14 and at its rear end in a bearing 26 associated with the rear disc 22.

A driven member 30 is secured to the rear end of the shaft 24. A driver 32 adjacent the member 30 has a hub 34 journalled in a bearing 36 of the front wall 38 of the rear section 6. The driven member 30 and shaft 24 are secured together for simultaneous rotation.

Figure 2:
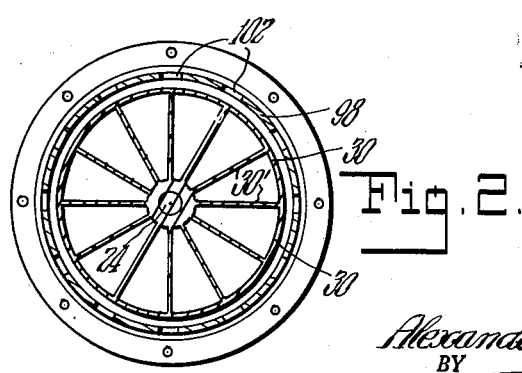
Fig. 2 is a small scale sectional elevational view on the line 2—2 of Fig. 1.
Figure 3:
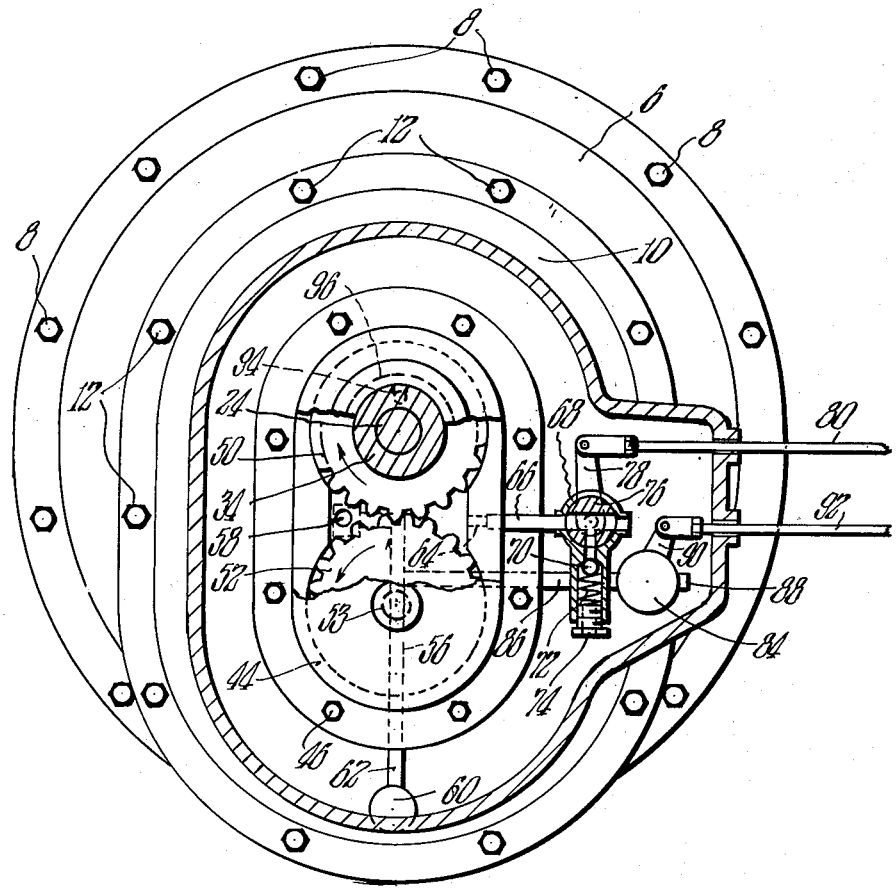
Fig. 3 is a sectional elevational view on the line 3—3 of Fig. 1.

The members 30 and 32 are cup-shaped and have radially extending circumferentially spaced vanes 30' and 32' respectively which are more clearly shown in Fig. 2. With liquid in the spaces between the vanes, one of the members will be driven by the rotation of the other.

A pump casing 40 is bolted by bolts 42 to the member 38 and has a forward cap 44 secured thereto by means of bolts 46.

Gears 50 and 52 within the casing provide a pump. The gear 50 is secured to the hub 34 and the gear 52 has a shaft 53 rotatable in the casing.

The lower portion of the housing provides a sump, as shown, for a liquid, such as oil. A passageway 56 extends upwardly in the member 38 to an inlet 58 of the pump. A check valve 60 provided on a pipe 62 is connected to the passageway 56.

An outlet 64 of the pump is connected by 66 to a control valve 68 having an outlet as shown. This control valve has a valve 70 in a bore which is urged against its seat by means of a spring 72, as shown. A hollow adjusting member 74, screw threaded in the bore, tensions the spring 72 as may be desired.

A plug 76 rotatable in the valve 68 has a passageway therethrough and is oscillated by a lever 78 fixed thereto which is actuated by a rod 80 connected thereto. This rod extends through the housing and may be connected to a remotely located means for operating the plug.

A valve 84 is connected by 86 to the passageway 56 or inlet of the pump and has an outlet 88. The valve, as is usual, has an internal member which is movable between closed and open positions. A lever 90 fixed thereto is actuated by a rod 92 connected thereto. This rod member may also be operated from a remote location.

The hub 34 is provided with a passageway 94 extending from an annular chamber 96 of member 44 which is in communication with the discharge or outlet and with one or more of the pockets of member 32.

A cage 98 is also secured to member 32 and is secured by bolts 100 to member 22. This cage 98 is provided with a plurality of openings 102.

With shaft 4 being rotated, the member 32 is rotated so that gear 50 of the pump is rotated through hub 34. Liquid such as oil drawn from the reservoir by the pump is discharged thereby into channel 96 and through passageway 94 between members 30 and 32 so that member 30 is rotated by said oil.

When valve 84 is open the suction of pump is broken whereby the flow of oil to the members 30 and 32 ceases and member 32 is rotated by rotation of shaft 4 without rotating member 30 and shaft 24. With valve 84 open the motor driving shaft 4 may be readily started and operated at any desired speed there being no load to overcome.

The control valve may be adjusted for operation at any desired position so that the speed ratio of members 30 and 32 may be varied. That is, there may be any desired so called "slip" between members 30 and 32.

That is the plug 76 of the control valve may be closed and valve 70 adjusted to relieve at a predetermined pressure. This will provide a predetermined maximum speed of member 30 relative to member 32. By adjusting the plug of the control valve to some open position the amount of liquid in the work chamber is reduced and the speed of member 30 relative to the speed of member 32, is decreased.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

Driving mechanism comprising in combination, a closed housing having opposite end walls and an intermediate wall therebetween and a sump in the lower area thereof, aligned driving and driven shafts journalled in bearings in opposite end walls of said housing, a bladed driver fixed to said driving shaft and having a hub journalled in the intermediate wall of said housing, said driven shaft being journalled in the hub of said driver, a driven bladed member fixed to said driven shaft and positioned adjacent said driver to form a work chamber therebetween, a pump casing provided on the intermediate wall of said housing around the hub of said driver and having inlet and discharge means, a primary gear in said pump casing fixed on the hub of said driver and driven thereby, a secondary gear journalled in said pump casing and meshing with said primary gear, the hub of said driver being provided with a liquid discharge passageway extending from the discharge means of said pump casing through said driver to said work chamber, the intermediate wall of said housing being provided with a liquid inlet passageway extending from an inlet means in the sump in said housing to the inlet means of said pump casing, and independently operable by-pass valve means connected to the discharge passageway and operable to relieve a controlled amount of liquid from said pump casing discharge means, thus controlling the amount of liquid supplied to the work chamber.

ALEXANDER MacKENZIE, JR.

References Cited in the file of this patent

UNITED STATES PATENTS

| Number | Name | Date |
| --- | --- | --- |
| 2,116,992 | Weaver | May 10, 1938 |
| 2,151,075 | Berger | Mar. 21, 1939 |
| 2,372,326 | Hewitt | Mar. 27, 1945 |
| 2,385,834 | Nallinger et al. | Oct. 2, 1945 |
| 2,402,369 | Carlson et al. | June 18, 1946 |